Figure 1:
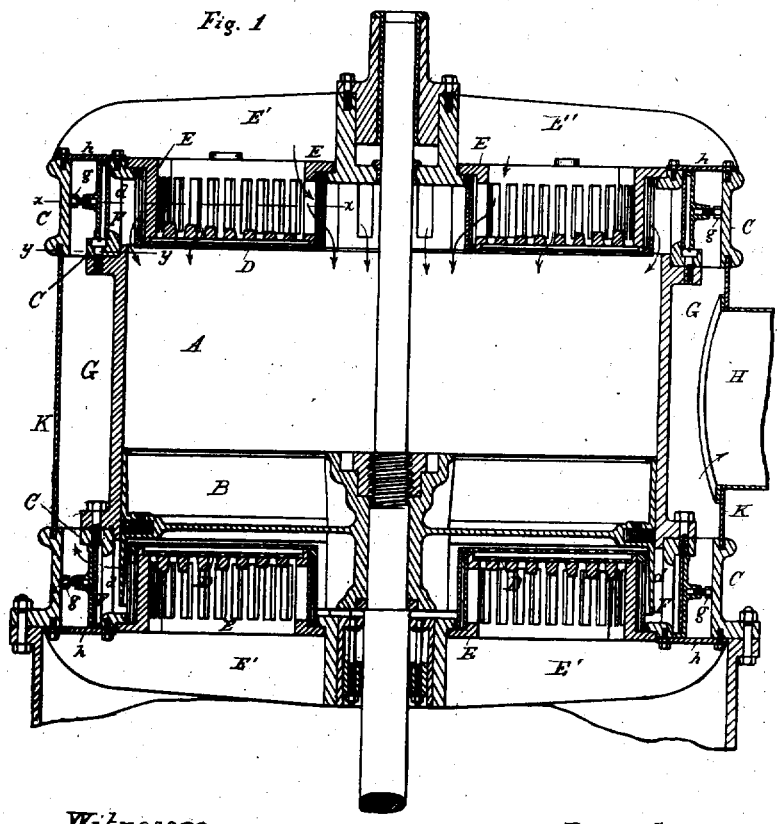

4 Sheets—Sheet 1.

P. L. WEIMER.

Blowing-Engine.

No. 8,545. Reissued Jan. 21, 1879.

Witnesses
W. G. Sands
J. Steidman Murray

Inventor
Peter L. Weimer

4 Sheets—Sheet 2.

P. L. WEIMER.

Blowing-Engine.

No. 8,545. Reissued Jan. 21, 1879.

Witnesses
W. G. Sands
J. Heidman Murray

Inventor
Peter L. Weimer

4 Sheets—Sheet 3.

P. L. WEIMER.

Blowing-Engine.

No. 8,545. Reissued Jan. 21, 1879.

Witnesses

W. G. Sands

J. Heidman Murray

Inventor

Peter L. Weimer

4 Sheets—Sheet 4.

P. L. WEIMER.

Blowing-Engine.

No. 8,545. Reissued Jan. 21, 1879.

Witnesses

W. G. Sands

J. Weidman, Murray

Inventor

Peter L. Weimer

UNITED STATES PATENT OFFICE.

PETER L. WEIMER, OF LEBANON, PENNSYLVANIA.

IMPROVEMENT IN BLOWING-ENGINES.

Specification forming part of Letters Patent No. 181,295, dated August 22, 1876; Reissue No. 8,545, dated January 21, 1879; application filed December 16, 1878.

*To all whom it may concern:*

Be it known that I, PETER L. WEIMER, of Lebanon, in the county of Lebanon and State of Pennsylvania, have invented certain Improvements in Blowing-Engines, of which the following is a specification:

The object of my invention is to produce a reciprocating blowing-engine which can be run at a high speed and under a high pressure without difficulty; and to this end the invention consists in various improvements in the construction and arrangement of the valves, the piston, and various minor details, as hereinafter described and explained.

Many attempts have hitherto been made to construct blowing-engines which could be driven at high speed against the high pressure of air required for furnace service; but, notwithstanding the success which has been attained in other high-speed steam machinery, the attempts to produce high-speed blowers have resulted in failure, and consequently the most approved blowers of the present day are of a size, weight, and cost far exceeding other steam apparatus of equal power.

In all experiments with blowing-engines three great difficulties have been encountered, viz: The impossibility of obtaining inlet and outlet valves of sufficient area to permit the free ingress and egress of the air; the impossibility of producing valves which would withstand the rapid motion and heavy pressure of the air, and, at the same time, permit the air to pass freely; and the large amount of "dead space" existing in the cylinder at the end of the stroke, preventing the economical working of the engine against high pressures.

Valves of various forms have been tested, among others flap-valves hinged at one side, lift or check valves having vertical guides, and valves of different styles operated mechanically with a positive motion; but it was found that the first two, in order to afford a free passage for the air, required to move so far that they could not open and close with sufficient frequency, and that, owing to the distance which they fell, the heavy pressure of air drove them down with such violence upon their seats that they were soon destroyed, while the last or positive-motion valve could not be made to open or close with sufficient frequency or suddenness, nor to afford the required area of opening for the inlet of the air. It is to overcome the difficulties above enumerated that my invention is intended.

The invention consists in the use of a flexible valve, provided with parallel slits or grated like a gridiron, arranged to rise and fall between a seat and a guard-plate of like form, whereby I obtain a large area for the passage of the air, render a slight movement of the valve sufficient to open it to its full capacity, and give the valve a firm support, so that it is protected from destructive wear; in constructing seats or chests to receive the inlet-valves of less diameter than the cylinder, and extending them therein, and providing them with valves in their sides or edges, as well as in the faces, whereby I compensate for the space occupied by the valve-seats, and obtain a valve-area fully or nearly equal to the area of the piston, thus allowing the air to enter freely and rapidly behind the receding piston; in arranging the inlet-valves in the ends and outlet-valves around the outside or circumference of the cylinder, and surrounding the latter by a chamber, which receives the air and conducts it to a pipe leading to the furnace or other required point, whereby a free egress of the air is permitted and the employment of a larger outlet-area allowed than when both the inlet and outlet valves are placed in the cylinder-head; in constructing the annular cylinder-head with a central hub and radial arms, provided with laterally-projecting flanges, which form supports for the seats or chests of the inlet-valves; and in recessing the piston and providing it with radial arms, in such manner that at the end of each stroke it fits down over and around the valve-chest, and fills, practically, all the space in the end of the cylinder, whereby it is caused to expel all the air, so that the engine can operate successfully and economically against a high pressure of air.

Figure 2:
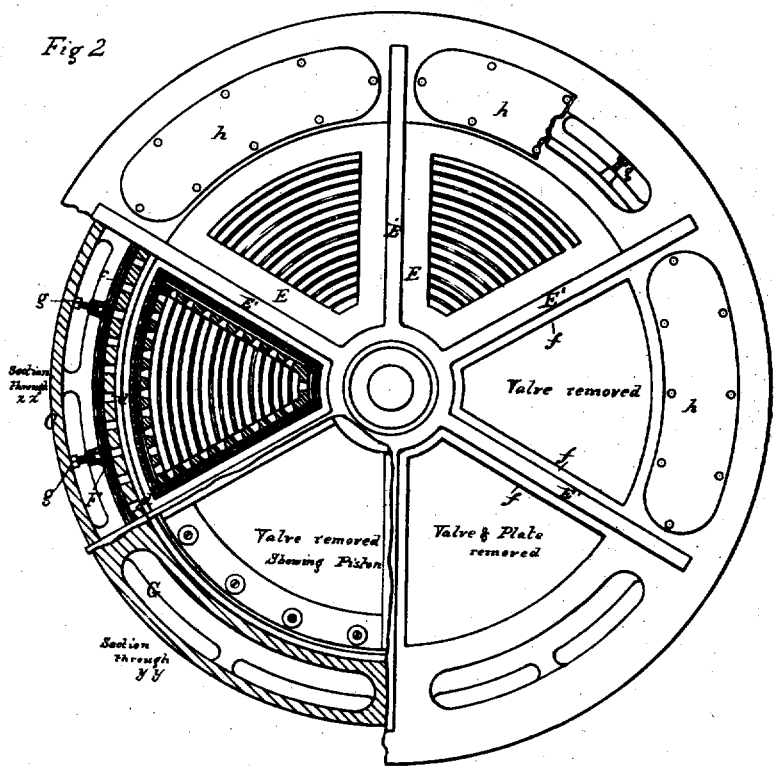
Figure 3:
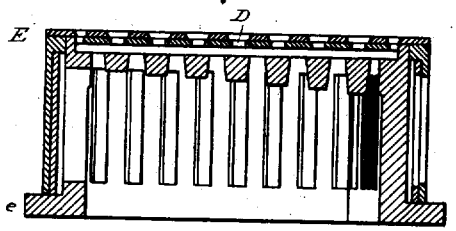
Figure 4:
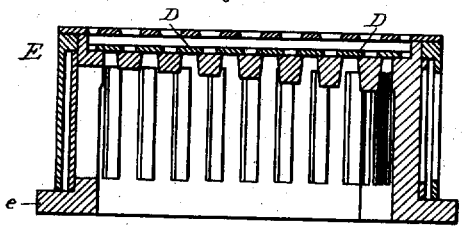
Figure 5:
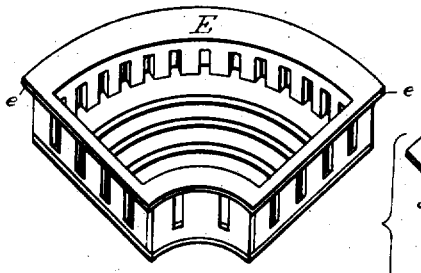
Figure 7:
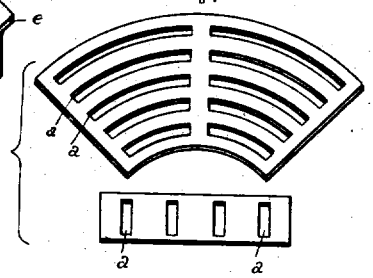
Figure 6:
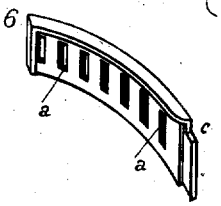
Figure 8:
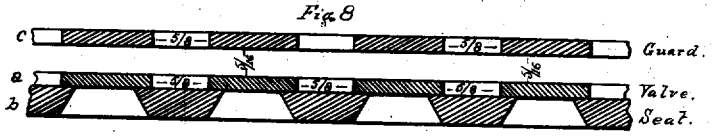
Figure 9:
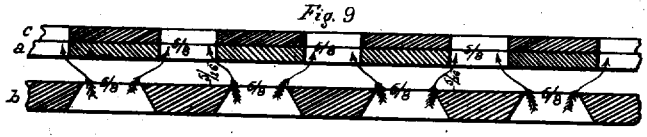

Figure 1 represents a longitudinal central section through my improved engine; Fig. 2, an end view of the same, with different portions taken in section on the various lines of Fig. 1 thereon indicated; Fig. 3, a sectional view of one of the lower inlet-valve chests and valves with the valves open; Fig. 4, a similar view with the valves closed; Fig. 5, a perspective view of one of the upper valve-chests and its valves; Fig. 6, a view of one of the outlet-valves and its guard-plate detached; Fig. 7, a view illustrating the form of the flexible inlet and outlet valves, the valves being shown detached from their seats; Figs. 8 and 9, enlarged sectional views, showing more clearly the construction and operation of the valves.

A represents the engine-cylinder; B, the reciprocating piston, mounted in the cylinder; C C, the two annular cylinder-heads, provided with radial arms E′ and laterally-projecting flanges *f*, connected to a central hub and bolted to the ends of the cylinder, serving as seats for the outlet-valves and as supports for the seats or chests of the inlet-valves; D, the inlet-valves; E, the seats or chests in which the inlet-valves are mounted; F, the outlet-valves; G, the annular chamber, into which the air is discharged from the cylinder through the outlet-valves; and H, a pipe, leading from the chamber G to the furnace or other desired point.

The construction of the valves, which constitutes the main feature of my invention, is most clearly represented in Figs. 3, 4, 5, 6, 7, 8, and 9. Each valve consists of a flat flexible sheet, of any desired form, provided, as shown in Fig. 7, with parallel slits *a*, like a gridiron, and mounted in such manner as to vibrate freely between a grated seat, *b*, and a grated guard-plate, *c*. The slits or openings in the three parts are made of equal width, and the seat and guard-plate arranged parallel with each other, and at such distance apart that the valve can only move a distance equal to one-half the width of the slits. The slits in the flexible valve are directly opposite the solid portion or bars of the seat, so that when the valve rests thereon it covers and closes the openings and prevents the air from passing through. The openings or slits in the guard-plate, however, correspond to or register with those in the flexible valve, so that when the valve is raised against the guard-plate, as shown in Figs. 3 and 9, the air can pass freely inward through the guard-plate, valve, and seat into the cylinder.

In practice, I find it best to make the slits or openings through which the air passes five-eighths of an inch in width, and to allow the valve to rise five-sixteenths of an inch; but it is obvious that this may be departed from, if desired.

By the use of the grated seat, valve, and guard, I obtain a very large aggregate area of opening for the air to pass through, and thus permit the cylinder to fill instantly when the engine is working at its highest speed; enable the valves to open to their maximum capacity, and close again by a very slight movement, so that they can operate instantly and with great rapidity, and without the usual noisy and destructive hammering common to valves having the usual long movement, and also give the largest valve-support at points near each other over its entire surface, thereby protecting it from destruction by the heavy pressure of air to which it is subjected, and by which it is driven violently back and forth.

The essential feature or characteristic of my valve is the grated flexible material in connection with the corresponding grated seat and a grated or other skeleton guard-plate; and it is obvious that the shape and size of the valve and the details of construction in other respects may be varied at will.

In constructing my engine I arrange the inlet-valves to occupy the entire end of the cylinder, and locate the outlet-valves around the outside or circumference of the cylinder, thus allowing room for valves of ample size and area. The inlet-valves D are mounted in sector-shaped chests or seats E, such as represented in Fig. 5, which are seated in openings in the cylinder-heads, as shown in Figs. 1 and 2. As shown in the drawings, the chests or seats have raised sides, like a box, and valves both in their faces and in said sides. The sides are formed with outside supporting-lips *e* at their outer ends, to rest upon the lateral flanges on the radial arms of the cylinder-heads and sustain the chests, which are inserted through the heads into the cylinder in the manner represented in Fig. 1, so that the valves in the side walls of the chests, as well as those in the face, admit air directly into the cylinder, as indicated by the arrows. By thus extending or sinking the valve-chests into the cylinder, and providing them with the valves in their side faces or walls, I am enabled to obtain a greatly-increased aggregate area of inlet-opening, and to compensate for the obstruction offered by the valve-seats in the faces, so that the air can enter freely and rapidly, and fill the cylinder instantly when the piston is traveling at the highest attainable speed.

The outlets for the air consist of parallel slits or openings *d*, made in the annular cylinder-heads C, which latter serve as seats for the outlet-valves F. As shown in the drawings, the heads C C are made hollow, or with an annular space in the interior. The slits or openings *d* extend from the interior of the cylinder through the inner side or wall of the heads into their interior space, as shown.

The slotted flexible valves F are inserted through large openings in the ends of the heads and placed over the slits *d*, and then secured in position by placing over them, as shown in Figs. 1 and 2, slotted guard-plates of a corresponding curved form, as shown in Fig. 7. These guard-plates are held and forced up tightly in place by bolts *g*, seated at one end in the plates, and bearing at their heads against the outer wall of the cylinder-heads, as shown.

The outlet-valves, seats, and guards are constructed and arranged to operate in precisely the same manner as the inlet-valves, the only difference being that of form, necessitated by the different locations in which they are mounted.

After the outlet-valves and guards are inserted, the openings in the ends of the head C C are covered and closed by plates *h*, as shown. In order to remove the valves it is only necessary to remove the plates and loosen the bolt *g*, when the guards and valves may be taken out.

The outer walls of the heads C are of greater diameter than the cylinder, and have their edges provided with grooves, into which are inserted the ends of a sheet-metal drum or cylinder, K, of such diameter that an annular space or chamber, G, exists between it and the cylinder A, as shown. The drum K is provided on one side with a pipe, H, leading to the furnace or other desired point. The air driven from the cylinder by the piston passes through the valves F into the chamber G, and thence through the pipe H.

The piston B is constructed, as shown, with a very wide surface-bearing, to reduce the wear and prevent the air from leaking past it, and is provided at its middle with a circumferential groove, containing a wooden packing, *h*, pressed outward by spiral springs against the face of the cylinder, the packing being prepared for use by a thorough boiling in tallow. The faces of the piston are recessed and shaped to fit down over, around, and between the valve-chests in such manner that at the end of each stroke it drives, practically, all the air from the cylinder, so that the full benefit of the stroke is realized, and the engine caused to operate effectively and economically when pumping the air at a high pressure.

The form of the piston, with its wide rim or periphery, its transverse ribs to enter between the valve-chests, and its thin body, combines lightness and strength in a remarkable degree, rendering it easy to operate, on account of its lightness, and durable, on account of the large-wearing surface produced.

While I prefer to construct the engine in all respects as shown and described, it is obvious that the arrangement of various details may be varied without departing from the limits of my invention. It is also obvious that my improved valves may be used in engines of any other construction, and in pumps for moving fluids as well as in blowing-engines.

Having thus described my invention, what I claim is—

1. A grated flexible valve, substantially as set forth.

2. In combination with a grated valve-seat, a grated flexible valve, substantially as described.

3. In combination with a grated valve-seat, a grated flexible valve and grated valve-guard, substantially as described.

4. The combination of a grated valve-seat, a grated flexible valve, and grated valve-guard, the valve being arranged to vibrate between the seat and the guard, the slits or openings in the valve and guard being arranged to correspond or register with each other, while those in the seats are arranged to be covered or closed by the valve, substantially as shown and described.

5. A valve-chest provided with grated valves in its face and sides.

6. A valve-chest having an unobstructed end, and provided with valves in its sides and face, substantially as shown.

7. The sector-shaped chest provided with valves in its sides and face, substantially as shown and described.

8. A valve-chest in which the ports or passages are controlled by a loose valve vibrating between the seat and guard, as and for the purpose set forth.

9. In a blowing-cylinder, the inlet and outlet passages provided with grated valves, which vibrate between the seats and guards, substantially in the manner set forth.

10. A blowing or other cylinder in which the area of inlet-valve openings is fully or nearly equal to the area of the piston, as set forth.

11. In combination with a cylinder and a piston having recessed faces, the valve-chests projecting into the cylinder, substantially as described.

12. In combination with a cylinder and a piston having recessed faces, the valve-chests projecting into the cylinder and provided with inlet-valves, substantially as described.

13. In combination with a cylinder and a piston having recessed faces, the valve-chests extending into the cylinder and provided with valves in their faces and walls, substantially as described.

14. The cylinder A, having inlet-valves located in its ends, and a series of outlet-valves located around its periphery or circumference, in combination with the chamber G, provided with a discharge-pipe, as and for the purpose described.

15. The combination of the cylinder and annular cylinder-head, provided with radial arms having laterally-projecting flanges and connected to a central hub, substantially as described.

16. The combination of the cylinder, annular cylinder-head, with radial arms having projecting flanges, and the inlet valve-chests, substantially as described.

17. In combination with a cylinder, the grated outlet-valves arranged in the annulus of the cylinder-head, as described.

18. In combination with the cylinder, the annular cylinder-head provided with air-outlets, flexible grated valves, and grated guards, substantially as described.

19. The recessed piston provided on both of its faces with radial arms, which serve the purpose of strengthening the piston, and also of expelling the air from between the valve-chests at the end of each stroke, substantially as described.

20. In combination with the cylinder and the valve-chests projecting therein, the recessed piston adapted to fit down over, around, and between the valve chests, as and for the purpose described.

PETER L. WEIMER.

Witnesses:
W. G. SANDS,
J. WEIDMAN MURRAY.